(12) United States Patent
Hou et al.

(10) Patent No.: US 8,099,702 B2
(45) Date of Patent: Jan. 17, 2012

(54) METHOD AND APPARATUS FOR PROXIMATE PLACEMENT OF SEQUENTIAL CELLS

(75) Inventors: Wenting Hou, Beijing (CN); Pei-Hsin Ho, Portland, OR (US)

(73) Assignee: Synopsys, Inc., Mountain View, CA (US)

( * ) Notice: Subject to any disclaimer, the term of this patent is extended or adjusted under 35 U.S.C. 154(b) by 787 days.

(21) Appl. No.: 12/182,442

(22) Filed: Jul. 30, 2008

(65) Prior Publication Data

US 2010/0031214 A1 Feb. 4, 2010

(51) Int. Cl.
*G06F 17/50* (2006.01)

(52) U.S. Cl. ......... 716/131; 716/126; 716/133; 716/134

(58) Field of Classification Search .................. None
See application file for complete search history.

(56) References Cited

U.S. PATENT DOCUMENTS

| | | | | |
|---|---|---|---|---|
| 5,661,663 A * | 8/1997 | Scepanovic et al. | ......... | 716/122 |
| 5,742,510 A * | 4/1998 | Rostoker et al. | ................ | 700/97 |
| 6,074,430 A * | 6/2000 | Tsukiboshi | .................... | 716/122 |
| 6,141,009 A | 10/2000 | Li et al. | | |
| 6,145,117 A * | 11/2000 | Eng | ............................... | 716/105 |
| 6,381,731 B1 * | 4/2002 | Grodd | ........................... | 716/111 |
| 6,467,074 B1 * | 10/2002 | Katsioulas et al. | ........... | 257/207 |
| 6,668,365 B2 * | 12/2003 | Harn | .............................. | 716/123 |
| 6,789,244 B1 * | 9/2004 | Dasasathyan et al. | ........ | 716/122 |
| 7,132,850 B2 | 11/2006 | Hashizume et al. | | |
| 7,302,376 B2 * | 11/2007 | Adler et al. | ...................... | 703/14 |
| 7,353,478 B2 * | 4/2008 | Dubey et al. | ................... | 716/119 |
| 7,469,394 B1 * | 12/2008 | Hutton et al. | .................. | 716/113 |
| 7,555,734 B1 * | 6/2009 | Wang et al. | ...................... | 716/122 |
| 7,581,197 B2 * | 8/2009 | Arunachalam | ............... | 716/119 |
| 7,624,364 B2 * | 11/2009 | Albrecht et al. | ................. | 716/113 |
| 7,624,366 B2 * | 11/2009 | Alpert et al. | ................. | 716/119 |
| 7,913,214 B2 * | 3/2011 | Yamada | ........................ | 716/113 |
| 2002/0123872 A1 | 9/2002 | Okada | | |
| 2004/0034517 A1 | 2/2004 | Adler et al. | | |

OTHER PUBLICATIONS

Hou et al., "FaSa: A Fast and Stable Quadratic Placement Algorithm," 2002 IEEE, pp. 1391-1395.*
Garrett et al., "Challenges in Clockgating for a Low Power ASIC Methodology," 1999 ACM, pp. 176-181.*
Hou et al., "A New Congestion-Driven Placement Algorithm Based on Cell Inflation," 2001 IEEE, pp. 605-608.*
Hou et al., "A Standard-Cell Placement Algorithm of Optimizing Multiple Objects," 2002 IEEE, pp. 867-870.*

(Continued)

*Primary Examiner* — Leigh Garbowski (74) *Attorney, Agent, or Firm* — Kenta Suzue; Haynes Beffel & Wolfeld LLP (57) ABSTRACT

Various methods and apparatuses (such as computer readable media implementing the method) are described that relate to proximate placement of sequential cells of an integrated circuit netlist. For example, the preliminary placement is received; and based on the preliminary placement, a group of sequential cells is identified as being subject to improved power and/or timing upon subsequent placement. In another example, identification is received of a group of sequential cells subject to improved power and/or timing upon subsequent placement; and proximate placement is performed of the identified group of sequential cells. In yet another example, a proximate arrangement of a group of sequential cells is received; and if proximate placement fails, then the group of sequential cells is disbanded and placement is performed of the sequential cells of the disbanded group.

22 Claims, 6 Drawing Sheets

```
┌─────────────────────────────────────────┐
│    RECEIVE PRELIMINARY PLACEMENT         │ ── 430
└─────────────────────────────────────────┘
                    │
                    ▼
┌─────────────────────────────────────────┐
│    BASED ON PRELIMINARY PLACEMENT,       │
│  IDENTIFY GROUP OF SEQUENTIAL CELLS      │
│   SUBJECT TO IMPROVED POWER/TIMING       │ ── 432
│      UPON SUBSEQUENT PLACEMENT           │
└─────────────────────────────────────────┘
```

OTHER PUBLICATIONS

Lu et al., "Combining Clustering and Partitioning in Quadratic Placement," 2003 IEEE, pp. 720-723.*

Mang et al., "techniques for Effecttive Distributed Physical Synthesis," DAC 2007, pp. 859-864.*

Search Report mailed Feb. 24, 2010 for PCT Family Member Application No. PCT/US2009/052091, 11 pages.

A. Rajagopal, "Clock Tree Design Challenges for Robust and Low Power Design" ISPD '06, Apr. 9-12, 2006 San Jose, CA consisting of 23 pages.

S. Zanella et al. "Analysis of the Impact of Process Variations on Clock Skew" IEEE Transactions on Semiconductor Manufacturing, vol. 13, No. 4, Nov. 2000, pp. 401-407.

J. Lou et al. "Estimating Routing Congestion Using Probabilistic Analysis" IEEE Transactions on Computer-Aided Design of Integrated Circuits and Systems, vol. 21, No. 1, Jan. 2002, pp. 32-41.

A. Rajaram et al. "Reducing Clock Skew Variability via Crosslinks" IEEE Transactions on Computer-Aided Design of Integrated Circuits and Systems, vol. 25, No. 6, Jun. 2006, pp. 1176-1182.

Y. Lu et al. "Navigating Registers in Placement for Clock Network Minimization" DAC 2005, Jun. 13-17, 2005, pp. 176-181.

D. Duarte et al., "A Clock Power Model to Evaluate Impact of Architectural and Technology Optimizations" IEEE Transactions on Very Large Scale Integration (VLSI) Systems, vol. 10, No. 6, Dec. 2002, pp. 844-855.

R. Chaturvedi et al. "Buffered Clock Tree for High Quality IC Design" IEEE Computer Society, Jun. 2004, pp. 1-6.

Y. Cheon et al. "Power-Aware Placement" DAC 2005, Jun. 13-17, 2005, pp. 795-800.

* cited by examiner

METHOD AND APPARATUS FOR PROXIMATE PLACEMENT OF SEQUENTIAL CELLS

BACKGROUND

1. Field of the Invention

The present technology relates to the synthesis of an integrated circuit with sequential cells, with the goal of improved power/timing performance.

2. Description of Related Art

An integrated circuit design flow typically proceeds through the following stages: product idea, EDA software, tapeout, fabrication equipment, packing/assembly, and chips. The EDA software stage includes the steps shown in the following table:

| EDA step | What Happens |
| --- | --- |
| System Design | Describe the functionality to implement<br>What-if planning<br>Hardware/software architecture partitioning |
| Logic Design and Functional Verification | Write VHDL/Verilog for modules in system<br>Check design for functional accuracy, does the design produce correct outputs? |
| Synthesis and Design for Test | Translate VHDL/Verilog to netlist<br>Optimize netlist for target technology<br>Design and implement tests to permit checking of the finished chip |
| Design Planning | Construct overall floor plan for the chip<br>Analyze same, timing checks for top-level routing |
| Netlist Verification | Check netlist for compliance with timing constraints and the VHDL/Verilog |
| Physical Implement. | Placement (positioning circuit elements) and routing (connecting circuit elements) |
| Analysis and Extraction | Verify circuit function at transistor level, allows for what-if refinement |
| Physical Verfication (DRC, LRC, LVS) | Various checking functions: manufact., electrical, lithographic, circuit correctness |
| Resolution Enhanc. (OPC, PSM, Assists) | Geometric manipulations to improve manufacturability |
| Mask Data Preparation | "Tape-out" of data for production of masks for lithographic use produce finished chips |

In a typical circuit design process, a human designer runs an EDA (electronic design automation) tool which places a circuit design according to a computer implemented algorithm, including placement of the sequential cells of the circuit design. After the computer implemented placement, the human designer then manually checks and identifies the banks of sequential cells which cause poor results, such as bad timing or bad routability. This human process of trial and error is slow and expensive. Moreover, as the total number of cells in a circuit design approaches a significant fraction of a million cells, and even goes well into and beyond multiple millions, such a labor intensive process becomes even more error prone. Automated solutions also fall short, because automated solutions for placement and routing optimize parameters such as routability or timing, without accounting for further considerations such as low power. Modification of the automated solution, to add such considerations, has caused suboptimal results in the primary requirements such as routability or timing. Accordingly, the typical designer will rely on automated solutions to generate a design optimizing parameters such as routability or timing, and then manually modify the results, despite the labor intensive and error prone nature of such a process.

Various specific approaches which fail to meet expectations are further discussed below.

Manual selection and packing of groups of sequential cells have the drawbacks previously discussed. The major drawbacks are that the manual sequential cell banking process is tedious, time consuming and improbable to minimize the impact of sequential cell banking to timing and routability.

Another approach iterates between placement and clock-tree synthesis. Sequential cells driven by a clock-tree cell (buffer or ICG) are placed into a Manhattan circle with the center being the clock-tree cell. Manhattan circling may not save as much power as sequential cell banking because the net capacitance of a Manhattan circle usually exceeds the net capacitance of a sequential cell bank for driving the same number of sequential cells.

In another approach, a minimal number of links are added to a clock tree to reduce the clock tree's susceptibility to variation without paying the full power penalty of using clock meshes. However, analyzing the non-tree clock topologies using fast SPICE may complicate the design flow, because most designs don't need fast SPICE for clock tree topologies to analyze clock trees.

SUMMARY

Various aspects of the technology address a method of circuit design of sequential cells, and computer instructions performing the method. Sequential cells are defined to mean flip-flops and/or latches.

One embodiment has the method steps of receiving a preliminary placement of the sequential cells of a circuit design netlist; and based on the preliminary arrangement of the preliminary placement, identifying a group of the sequential cells as being subject to improved power consumption and improved timing variation, upon performing subsequent placement of the identified group of sequential cells. The preliminary placement is based on at least timing and routability of the sequential cells. The opportunity of improved power consumption and improved timing variation of the identified group of sequential cells, would be a result of subsequent placement of the identified group of sequential cells into a proximate arrangement of rows and columns. This proximate arrangement of the sequential cells of the group is different from the preliminary arrangement of the sequential cells of the group.

Some embodiments further include, performing the subsequent placement of the group into the proximate arrangement of rows and columns. However, despite the opportunity of improved power consumption and improved timing variation which would result from the subsequent placement of the identified group of sequential cells into a proximate arrangement of rows and columns, the subsequent placement could fail. For example, the subsequent placement could fail due to inability to route the proximate arrangement. Responsive to such failure, the identified group is disbanded, in this case due to the identified group being subject to improved routability, upon performing subsequent placement of the disbanded group. The subsequent placement results in a subsequent arrangement of the sequential cells of the disbanded group, which is different from the proximate arrangement of rows and columns.

In various embodiments, the identified group of sequential cells satisfy various criteria, such as the group of the sequential cells belonging to a single pipeline stage, the group of the sequential cells constituting a single register transfer language vector (e.g., of at least 16 sequential cells and/or no more than 128 sequential cells), and/or the group of the sequential cells being clocked by a common gated clock signal. Another more formulaic criterion satisfied by the identified group of sequential cells, is that a first ratio exceeds a second ratio. The first ratio is i) a total area of the group of the sequential cells, over ii) an area of a smallest rectangle enclosing the group of the sequential cells. The second ratio is i) a total area of all sequential cells of the circuit design netlist, over ii) a total die area of the circuit design netlist minus a total area of hard macros of the circuit design netlist.

Another embodiment has the method steps of receiving an identification of a group of the sequential cells of a circuit design netlist; and performing proximate placement of the group into a proximate arrangement of rows and columns. The identification of the group is based on a preliminary arrangement from a preliminary placement of the sequential cells. The preliminary placement is based on at least timing and routability of the sequential cells. The group in the proximate arrangement has improved power consumption and improved timing variation, relative to the group in the preliminary arrangement.

However, despite the opportunity of improved power consumption and improved timing variation of the identified group of sequential cells in the proximate arrangement of rows and columns, the proximate placement could fail. For example, the proximate placement could fail due to inability to route the proximate arrangement. Responsive to such failure, the identified group is disbanded, in this case due to the identified group being subject to improved routability, upon performing subsequent placement of the disbanded group. The subsequent placement results in a subsequent arrangement of the sequential cells of the disbanded group, which is different from the proximate arrangement of rows and columns.

In some embodiments, performing the proximate placement includes determining a number of the rows and a number of columns of the proximate arrangement of the group of sequential cells. In one example, the number of the rows and a number of columns, are determined such that, a first height-over-width ratio of the proximate arrangement approximates a second height-over-width ratio of a smallest rectangle enclosing the group of the sequential cells in the preliminary placement.

In some embodiments, performing the proximate placement includes determining relative locations in the proximate arrangement of sequential cells in the group. For example, such relative locations in the proximate arrangement are based on relative locations in the preliminary arrangement of sequential cells in the group. In another example, relative horizontal coordinate locations in the proximate arrangement of sequential cells in the group, are determined based on relative horizontal coordinate locations in the preliminary arrangement of sequential cells in the group. In another example, relative vertical coordinate locations in the proximate arrangement of sequential cells in the group, are determined based on relative vertical coordinate locations in the preliminary arrangement of sequential cells in the group. Some embodiments further include placing integrated clock gating cells at an intermediate location of the proximate arrangement, such as in a middle row (or near middle row) or middle column (or near middle column) or other intermediate area.

Another embodiment has the method steps of receiving a proximate arrangement of rows and columns of a group of the sequential cells of a circuit design netlist; and disbanding the group of the proximate arrangement. Such disbanding is responsive to failure of the proximate arrangement of rows and columns. For example, the proximate placement could fail due to inability to route the proximate arrangement, for example, determining that a number of nets of the proximate arrangement exceeds a routing capacity. The disbanded group is subject to improved routability, upon performing subsequent placement of the disbanded group. The subsequent placement results in a subsequent arrangement of the sequential cells of the disbanded group, which is different from the proximate arrangement of rows and columns.

Some embodiments further include, performing the subsequent placement of the sequential cells of the disbanded group.

Other embodiments are computer readable media with computer readable instructions for performing any of the methods described herein.

DETAILED DESCRIPTION

Process Flow

Figure 1:
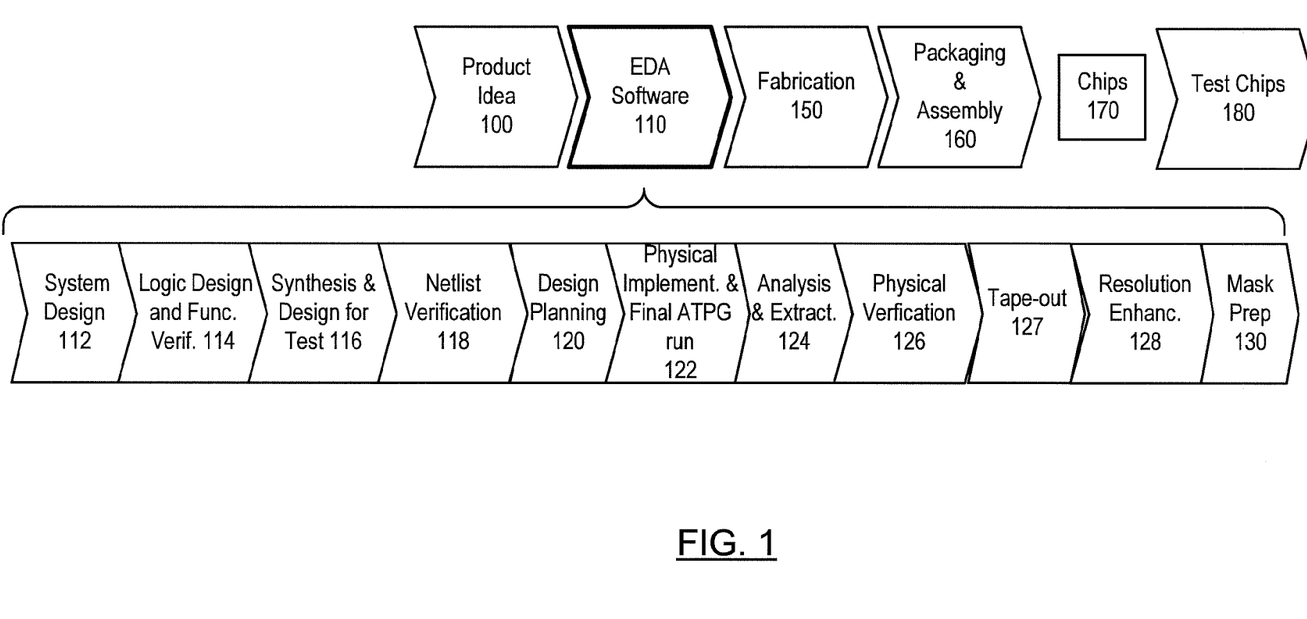
FIG. 1 is a simplified diagram of the process of designing and manufacture of integrated circuits.

FIG. 1 shows a simplified representation of an illustrative digital integrated circuit design and test flow. As with all flowcharts herein, it will be appreciated that many of the steps in FIG. 1 can be combined, performed in parallel or performed in a different sequence without affecting the functions achieved. In some cases a re-arrangement of steps will achieve the same results only if certain other changes are made as well, and in other cases a re-arrangement of steps will achieve the same results only if certain conditions are satisfied. Such re-arrangement possibilities will be apparent to the reader.

At a high level, the process of FIG. 1 starts with the product idea (step 100) and is realized in an EDA (Electronic Design Automation) software design process (step 110). When the design is finalized, the fabrication process (step 150) and packaging and assembly processes (step 160) occur resulting, ultimately, in finished integrated circuit chips (result 170). Some or all of the finished chips are tested in step 180 on a tester machine using predefined test vectors and expected responses.

The EDA software design process (step 110) is actually composed of a number of steps 112-130, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the components steps of the EDA software design process (step 110) will now be provided.

System design (step 112): The designers describe the functionality that they want to implement, they can perform what-if planning to refine functionality, check costs, etc. Hardware-software architecture partitioning can occur at this stage. Example EDA software products from Synopsys, Inc. that can be used at this step include Model Architect, Saber, System Studio, and DesignWare® products.

Logic design and functional verification (step 114): At this stage, the VHDL or Verilog code for modules in the system is written and the design is checked for functional accuracy. More specifically, the design is checked to ensure that it produces the correct outputs in response to particular input stimuli. Example EDA software products from Synopsys, Inc. that can be used at this step include VCS, VERA, DesignWare®, Magellan, Formality, ESP and LEDA products. While some designs might at this stage already include certain design-for-test features such as scan chains and associated scan compression or decompression circuitry, these are not included in the terms "logic design" and "circuit design" as they are used herein.

Synthesis and design for test (DFT) (step 116): Here, the VHDL/Verilog is translated to a netlist. The netlist can be optimized for the target technology. Additionally, the implementation of a test architecture occurs in this step, to permit checking of the finished chips. Example EDA software products from Synopsys, Inc. that can be used at this step include Design Compiler®, Physical Compiler, Test Compiler, Power Compiler, FPGA Compiler, TetraMAX, and DesignWare® products. A current product for implementing a test architecture, with a few user-specified configuration settings as described above, is DFT MAX. DFT MAX is described in Synopsys, DFT MAX Adaptive Scan Compression Synthesis, Datasheet (2007), incorporated herein by reference.

Netlist verification (step 118): At this step, the netlist is checked for compliance with timing constraints and for correspondence with the VHDL/Verilog source code. Example EDA software products from Synopsys, Inc. that can be used at this step include Formality, PrimeTime, and VCS products.

Design planning (step 120): Here, an overall floor plan for the chip is constructed and analyzed for timing and top-level routing. Example EDA software products from Synopsys, Inc. that can be used at this step include Astro and IC Compiler products.

Physical implementation (step 122): The placement (positioning of circuit elements) and routing (connection of the same) occurs at this step. Example EDA software products from Synopsys, Inc. that can be used at this step include the Astro and IC Compiler products.

Analysis and extraction (step 124): At this step, the circuit function is verified at a transistor level, this in turn permits what-if refinement. Example EDA software products from Synopsys, Inc. that can be used at this step include AstroRail, PrimeRail, Primetime, and Star RC/XT products.

Physical verification (step 126): At this step various checking functions are performed to ensure correctness for: manufacturing, electrical issues, lithographic issues, and circuitry. Example EDA software products from Synopsys, Inc. that can be used at this step include the Hercules product.

Tape-out (step 127): This step provides the "tape-out" data for production of masks for lithographic use to produce finished chips. Example EDA software products from Synopsys, Inc. that can be used at this step include the CATS(R) family of products.

Resolution enhancement (step 128): This step involves geometric manipulations of the layout to improve manufacturability of the design. Example EDA software products from Synopsys, Inc. that can be used at this step include Proteus, ProteusAF, and PSMGen products.

Mask preparation (step 130): This step includes both mask data preparation and the writing of the masks themselves.

Introduction

For both wireless mobile and wired high-performance systems, low power and low susceptibility to variation are great challenges and differentiators for today's IC designs. IC power consumption can be categorized into dynamic and leakage power. Clock trees are major consumers of dynamic power because they switch very frequently and are spread across the chip. Clock trees are also major consumers of leakage power because they contain many buffers to drive all the wires and sequential cells (flops and latches) and to balance skew. Clock trees may consume as much as 40% of the total power consumed by the IC.

Clock trees are also major causes of IC's susceptibility to variation. Suppose that the clock path to the launching flop of a timing path is slowed down by 100 ps and the clock path to the capturing flop of the same timing path is sped up by 100 ps due to OCV (On-Chip Variation). Then the impact of OCV to the timing path would be at least 200 ps, doubling the impact of OCV to a single clock path.

Conventional clock tree synthesis methodologies try to synthesize low power and low skew clock trees given any arbitrary placement of the sequential cells and ICGs (Integrated Clock Gating cells), which is difficult and increasingly intractable.

The present technology addresses the importance of clock trees to the quality (such as low power and low skew) of the IC design, by placing the sequential cells and ICGs in a way to enable the synthesis of clock trees that are low-power and less susceptible to variation.

Power-aware placement technique places cells to shorten nets with high switching frequencies to minimize net switching power. Clock nets usually have the highest switching frequencies, so power-aware placement pulls sequential cells closer to the leaf-level clock-tree cell (buffer or ICG) that drives them, which is called sequential cell clumping. Around 80% of the net capacitance of a clock tree is on the nets between the leaf-level clock-tree cells and the sequential cells, so sequential cell clumping can effectively reduce the net capacitance of the clock tree at the leaf level and thus save clock-tree power.

The automatic sequential cell placement technique described herein enables the synthesis of low-power clock trees for low-power ICs. On 7 industrial designs, compared to (1) a commercial base flow and (2) the power-aware placement technique, the technique respectively reduced clock-tree power by 19.0% and 14.9%, total power by 15.3% and 5.2% and WNS under on-chip variation (±10%) by 1.8% and 1.5% on average.

The automated timing and routability driven algorithm minimizes impacts to design timing and routability by generating and placing sequential cell banks according to both placement, timing and congestion information of the design. More specifically, the algorithm automatically (1) identifies sequential cell groups based on an initial placement of the design, (2) places sequential cells of each group into a rectangular sequential cell bank based on an initial placement of the sequential cells, (3) avoids forming sequential cell banks that may impact design timing based on timing analysis and (4) avoids forming sequential cell banks that may impact routability based on a placement-based congestion map.

The automatic sequential cell banking algorithm and the power-aware placement technique was implemented on top of a state-of-the-art commercial physical synthesis tool, IC Compiler for Synopsys. However, various commercial and noncommercial physical synthesis tools may take advantage of this technology. One implementation applied the default physical synthesis flow, power-aware placement flow and automatic sequential cell banking flow on 7 industrial designs through the whole physical synthesis flow including placement, clock-tree synthesis and routing. The designs have 14K to 259K cells in 90 nm and 65 nm technologies. The designs model OCV as 10% derating (the delay of each wire or cell can vary ±10%) with CRPR (Clock Reconvergence Pessimism Removal) in the timer of the commercial tool. The designs measure routability by the number of routing DRC (Design Rule Checking) violations after detailed route. In modern industrial design flow, routing DRC violations after automatic detailed route are typically fixed by design engineers using a graphical user interface.

Compared to the default flow and power-aware placement flow, the automatic sequential cell banking algorithm respectively reduced clock-tree power by 19.0% and 14.9%, total chip power by 15.3% and 5.2%, skew under OCV by 2.5% and 0.6% and WNS (Worst Negative Slack) under OCV by 1.8% and 1.5%, on average. In terms of routability, the automatic sequential cell banking algorithm achieved 30.0% improvement over the power-aware placement flow. Compared to the default flow, the impact of automatic sequential cell banking algorithm to routability is limited to 5.0%.

The following sections: introduce the timing and routability driven sequential cell banking algorithm and how sequential cell banking fits in a typical physical synthesis flow; describe in detail how sequential cells are placed into sequential cell banks; present the experimental results and analysis; and discuss other features and conclude.

Timing and Congestion Driven Sequential Cell Banking

The following discussion shows how timing and routability driven automatic sequential cell banking fits into a complete physical synthesis flow and describes the sequential cell banking algorithm.

Physical Synthesis Flow

Figure 2:
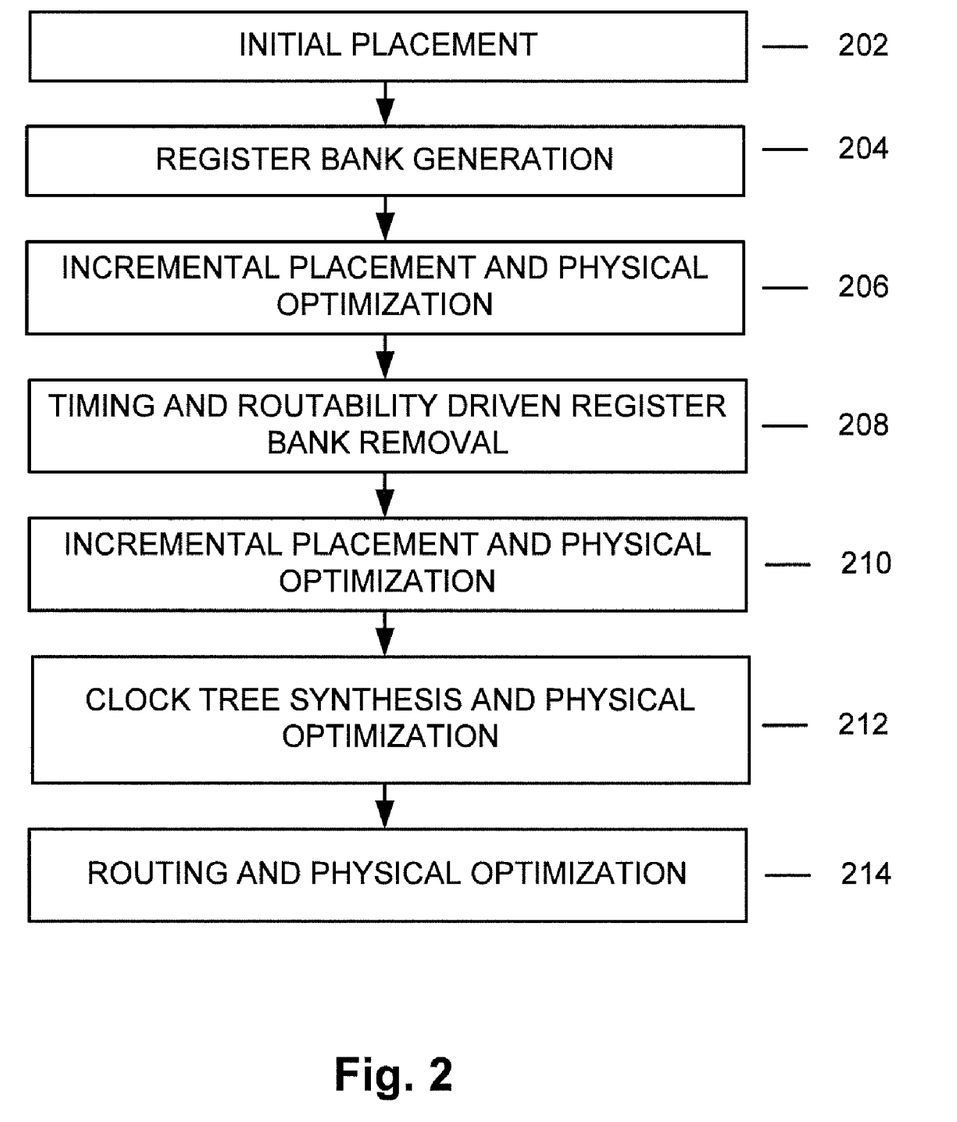
FIG. 2 is a simplified flowchart of an example process of the improved placement of a bank, or group, of sequential cells of an integrated circuit.

FIG. 2 shows how sequential cell banking can be incorporated into a typical physical synthesis flow. First, initial placement of the mapped netlist is performed in Step 202. In the initial placement, the sequential cells together with the rest of the design are placed for optimizing timing and routability by the placer. If the placer decided to place the sequential cells far away from each other (sparsely) for timing and routability, placing them side-by-side touching each other into a sequential cell bank may incur larger negative impact to timing and routability, assuming that the placer was doing a reasonable job. In other words, the algorithm goals of the placer are violated too much by banking the sequential cells that are placed far away from each other, assuming that the placer is "smart". After the initial placement of the mapped netlist in Step 202, sequential cell bank (also called group) generation is performed in Step 204 based on the placement of the design Then in Step 206 an incremental placement and placement-based logic optimization to physically optimize the design containing the sequential cell banks formed in Step 204, are performed. In Step 208, certain sequential cell banks are disassembled (also called disbanded) to minimize the impact of sequential cell banking to timing and routability. In Step 210 another incremental placement and placement-based logic optimization to relocate the disassembled sequential cells to minimize timing and routing congestion, are performed. Finally, in step 212 clock tree synthesis and optimization are performed, and in step 214 routing and physical optimization are performed.

Sequential cell banks are treated as hard macros like memories or hard IPs during both global and detailed placements that may happen throughout the physical synthesis flow. Cells as discussed herein are not required to be standard cells in a standard cell library. "Hard macro" is a placed and routed cell having a fixed layout. "Soft macro" is a cell described by a netlist and having a modifiable layout.

If the detailed placer cannot remove an overlap involving a sequential cell bank, the detailed placer disassembles the sequential cell bank into individual sequential cells and ICGs and tries to legalize the placement again. Sequential cells and ICGs in a sequential cell bank can be sized during physical optimization in Steps 206 and 210. The rest of the physical synthesis operations like CTS (Clock Tree Synthesis) in Step 212 and global and detailed routing in Step 214 treat the sequential cells and ICGs in sequential cell banks as individual cells with fixed placements.

FIGS. 3, 4A, 4B, and 4C are varying flowcharts directed respectively to an overall aspect of the technology, and various more specific aspects of the technology described in FIG. 2.

Figure 3:
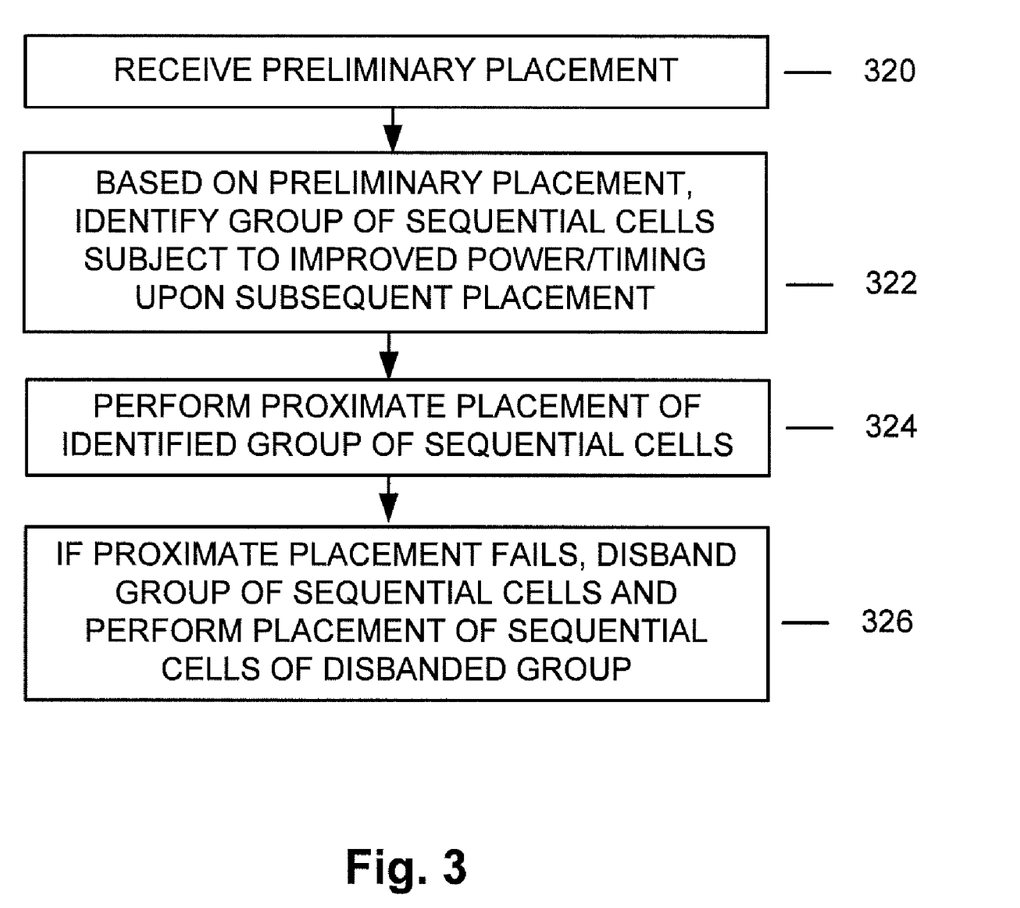
FIG. 3 is another simplified diagram of an example process of the improved placement of a group of sequential cells of an integrated circuit.

In FIG. 3, the flowchart includes the following steps. In Step 320, the preliminary placement is received. In Step 322, based on the preliminary placement of Step 320, a group of sequential cells is identified that are subject to improved power and/or timing upon subsequent placement. In Step 324, proximate placement is performed on the identified group of sequential cells. In Step 326, if proximate placement fails, the group of sequential cells is disbanded and placement is performed of the sequential cells of the disbanded group.

Figure 4A:
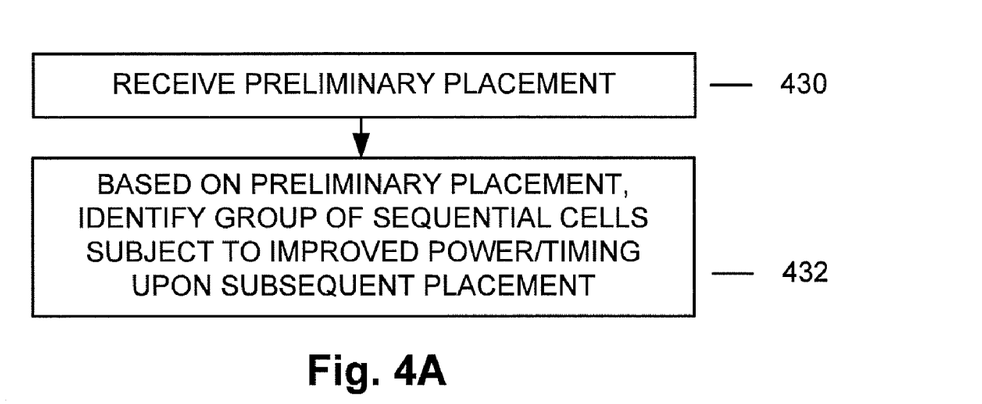
FIGS. 4A, 4B, and 4C are simplified diagrams of various example processes of the improved placement of a group of sequential cells of an integrated circuit.

In FIG. 4A, the flowchart includes the following steps. In Step 430, the preliminary placement is received. In Step 432, based on the preliminary placement, a group of sequential cells is identified as being subject to improved power and/or timing upon subsequent placement.

Figure 4B:
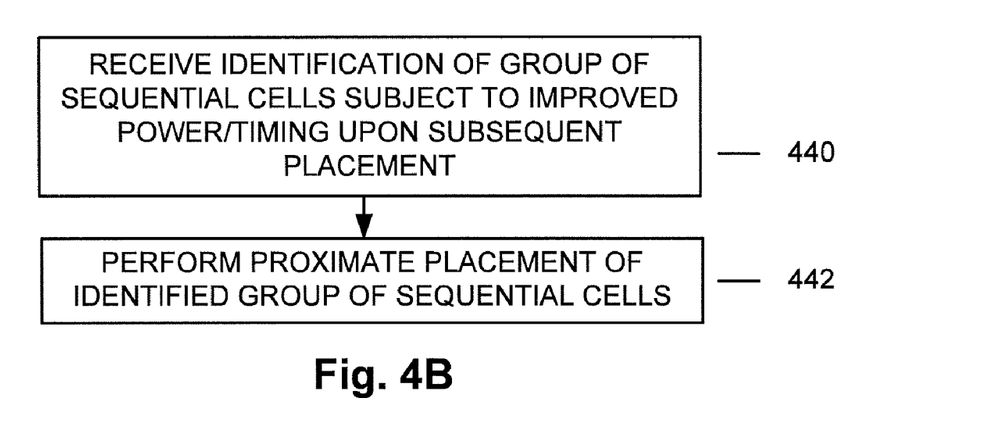

In FIG. 4B, the flowchart includes the following steps. In Step 440, identification is received of a group of sequential cells subject to improved power and/or timing upon subsequent placement. In Step 442, proximate placement is performed of the identified group of sequential cells.

Figure 4C:
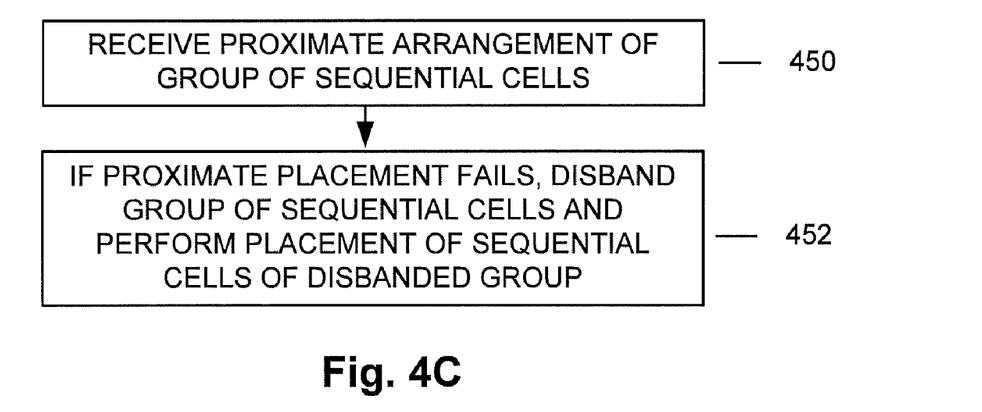

In FIG. 4C, the flowchart includes the following steps. In Step 450, a proximate arrangement of a group of sequential cells is received. In Step 452, if proximate placement fails, then the group of sequential cells is disbanded and placement is performed of the sequential cells of the disbanded group.

Placement-Driven Sequential Cell Bank Generation

This section describes identification of sequential cells to be included in a sequential cell bank in Step 204 of the flow shown in FIG. 2.

If a set of sequential cells form a single pipeline stage in the microarchitecture of the IC design, the sequential cells should be placed close to each other to minimize timing and congestion of the design. A "single pipeline stage" in some embodiments is a processing unit including sequential cells, where a piece of data is processed by a sequence of such pipeline stages, to increase performance such as throughput. The single pipeline stage is able to process the stage of a second, following, piece of data shortly after processing by that stage of a first, preceding, piece of data. For example, a pipelined multiplier and adder could begin processing new input, prior to completely processing an old input. In yet other embodiments, multiple pipeline stages are placed into sequential cell banks which demonstrate improved power and/or timing.

In other words, by carefully packing the set of sequential cells into a sequential cell bank, as discussed below, the sequential cells may not be too far away from their ideal placements in terms of timing and routability. Therefore the sequential cell bank should not impact the design timing or routability much while reducing clock-tree power and skew.

Three exemplary criteria are applied to heuristically identify sequential cells that are part of a single pipeline stage in the microarchitecture of the design:

Criterion 1. the set of sequential cells are directly driven by a single ICG (Integrated Clock Gating cell), Criterion 2. the set of sequential cells appear to constitute a single vector at the RTL level according to their names, and Criterion 3. the set of sequential cells are not placed "too sparsely" in the initial placement (Step 202 of FIG. 2).

In some embodiments, a sequential cell bank is generated for any set of sequential cells that either satisfies both Criterion 1 and Criterion 3, or satisfies both Criterion 2 and Criterion 3. In other words, for a set of sequential cells that satisfies either Criterion 1 or Criterion 2, Criterion 3 acts as a final filter. The intuition behind Criterion 3 is that if the set of sequential cells are placed spread across the chip in the initial placement, forcing them into a sequential cell bank may incur too much increase in wire length and/or degradation in timing. In other embodiments, other combinations of Criteria satisfy the requirement for sequential cell bank generation, such as Criterion 1, Criterion 2, or Criterion 3 alone; Criterion 2 and Criterion 3; or some other criterion/criteria indicative of a single pipeline stage of sequential cells.

Now each criterion above is discussed in more detail. Most designs in 90 nm or smaller feature sizes employ clock gating to save clock-tree power. Clock gating is usually implemented using ICGs (Integrated Clock Gating cells). An ICG has two input signals (pins), clock and enable, and one output signal (pin), the gated clock. If the enable signal is off then the gated clock signal is off. Otherwise the clock signal propagates through the gated clock signal.

If a set of sequential cells is driven by the same ICG, the set of sequential cells capture new input data under exactly the same enable conditions. This usually indicates that the set of sequential cells are part of a single pipeline stage in the microarchitecture of the IC design. If the set of sequential cells also satisfies Criterion 3, the set of sequential cells is made into a minimum number of sequential cell banks, such that each sequential cell bank contains 128 or fewer sequential cells. Generating sequential cell banks with more than 128 sequential cells is avoided in some embodiments, because sequential cell banks of that size often (1) involve overlaps that the detailed placer cannot resolve and (2) cause routability issues. The resulting sequential cell bank can have an ICG in the middle row to reduce clock skew.

Criterion 2 says that if a set of at least 16 sequential cells appear to be in the same vector at the RTL level according to their based names, they most likely are part of a single pipeline stage. If the set of sequential cells also satisfies Criterion 3, the set of sequential cells would be made into a minimum number of sequential cell banks such that each sequential cell bank contains 128 or fewer sequential cells.

Criterion 3 says that if the set of sequential cells are placed "too sparsely" in the initial placement of the netlist, even if the set of sequential cells satisfies Criterion 1 or Criterion 2, a sequential cell bank is not formed for this set of sequential cells. The set of sequential cells are placed "too sparsely" if the ratio of the total area of the set of sequential cells over the area of the bounding box of the set of sequential cells is less than the ratio of the total area of all sequential cells of the design over the "standard-cell area" of the die. The "standard-cell area" of the die is the total die area minus the total area of the hard macros in the die.

Timing and Routability Driven Sequential Cell Bank Removal

This describes how to disassemble sequential cell banks in Step 208 of FIG. 2 to minimize the impact of sequential cell banking to timing or routability.

If a sequential cell is included in a sequential cell bank, the placer can no longer move individual sequential cells in the sequential cell bank in separation; the placer must move the entire bank. Thus it becomes more difficult for the physical synthesis tool to relocate the sequential cell to optimize a timing path or minimize routing congestion that involves the sequential cell.

To minimize the impact of sequential cell banking to design timing, after the timing and congestion driven placement in Step 206, if a pin of a sequential cell still has a negative slack that is within 20% of the WNS (Worst Negative Slack) of the design, the sequential cell bank is disassembled in Step 208 of the flow in FIG. 2.

By disassembling a sequential cell bank, the placer is allowed to freely place the individual sequential cells (of the disassembled sequential cell bank) anywhere in the chip. The sequential cells are no longer forced to be placed side-by-side in the sequential cell bank. This is a change in placement constraints during physical implementation, and not a change to the RTL code of the design. The placer freely places the sequential cells of an RTL vector in a chip during physical implementation for timing and routability.

To minimize the impact to routability, a congestion map is built based on the current placement. The congestion map is a grid that divides the design into cells. A cell of the congestion map is overflowed if the estimated number of nets going through an edge of the cell exceeds the routing capacity of the edge of the cell. If a sequential cell bank overlaps with an overflowed cell of the congestion map, the sequential cell bank is we disassembled in Step 208 of the flow in FIG. 2.

Note that subsequent timing and congestion driven placement and placement-based logic optimization in Step 210 can relocate individual disbanded sequential cells to minimize timing.

Sequential Cell Placement in Sequential Cell Banks

This section illustrates how to determine the dimensions of a sequential cell bank and place sequential cells within the sequential cell bank.

Sequential Cell Bank Dimensions

To determine the dimensions of a sequential cell bank, first measured is the ratio of the height over the width of the bounding box of the set of sequential cells in the initial placement. Then determined are the numbers of rows and columns of the sequential cell bank such that the height-over-width ratio of the sequential cell bank would approximate the height-over-width ratio of the bounding box. The intuition behind this method is that this has a higher chance to minimize the displacement from the initial placement of the set of sequential cells to their placements within the sequential cell bank.

Sequential Cell Placement within a Sequential Cell Bank

Figure 5:
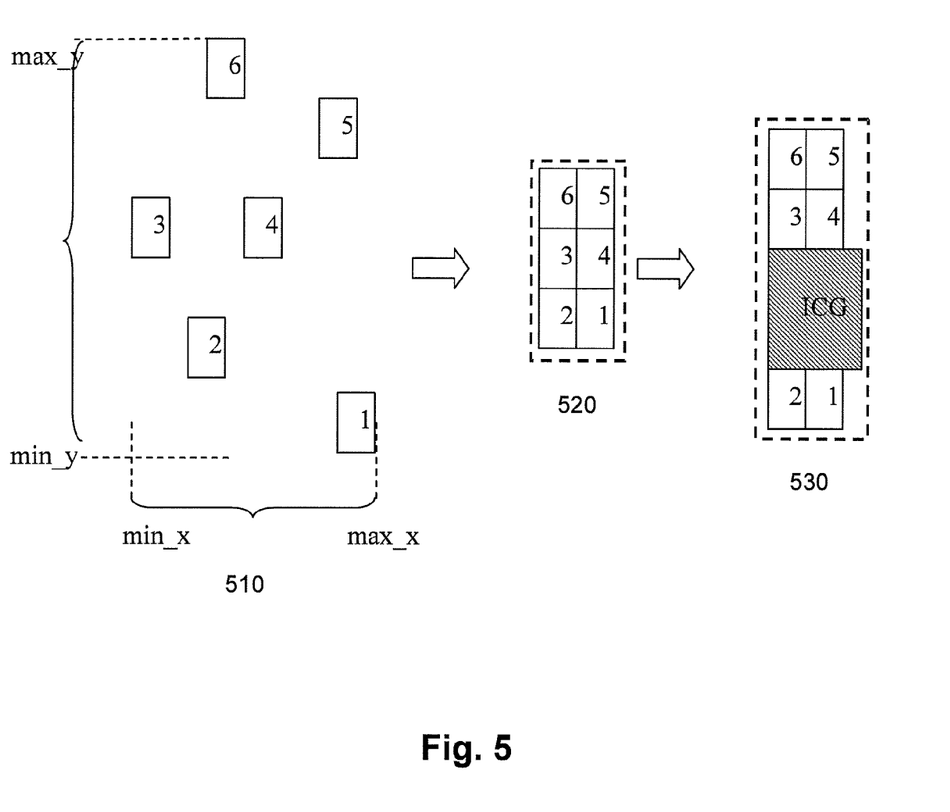
FIG. 5 is a simplified diagram of the process of performing proximate placement of a group of sequential cells, and using the information from a preliminary placement to perform proximate placement.

The relative locations are computed of the sequential cells within a sequential cell bank based on the relative locations of the sequential cells in the initial placement to minimize total displacement. Suppose that a set of sequential cells in 510 are placed into an m by n (m rows and n columns) sequential cell bank. First the sequential cells are sorted according to their y coordinates and the sequential cells grouped into m rows such that each row contains n sequential cells except that the last row may contain n or fewer sequential cells. Then sort the sequential cells are sorted in each row according to their x coordinates to determine their relative locations in each row. If the sequential cell bank is driven by an ICG, the ICG is placed in an additional middle row. For example, in FIG. 5 in 520, 6 sequential cells are placed in a 3 by 2 sequential cell bank. First the 6 sequential cells are sorted into the ordered sequence 1, 2, 3, 4, 5 and 6 according to their y coordinates. According to this ordered sequence the sequential cells are grouped into 3 rows: {1, 2}, {3, 4} and {5, 6}. Inside each row, the sequential cells are sorted according to their x coordinates and the final relative placements of the sequential cells are determined in each row as {2, 1}, {3, 4} and {6, 5}. Finally in 530 a middle row is inserted into the sequential cell bank to place the ICG. The placed sequential cell bank is shown in FIG. 5.

Experimental Results

This section discusses and analyzes the experimental results.

Experiment Setup

The automatic sequential cell banking algorithm and the power-aware placement technique are implemented on the top of a commercial physical synthesis tool. The commercial physical synthesis tool has built-in timing and power analysis engines that provide the timing and power numbers for our experiments. The timing analysis engine models OCV (On-Chip Variation) using (1) derating in which the delay of each wire or cell can vary either way for certain user-specified percentages and (2) CRPR (Clock Reconvergence Pessimism Removal).

The experiments are performed on 7 industrial designs ranging from 14K to 259K cells in 90 nm and 65 nm technologies. The statistics of the designs are summarized in Table 1.

TABLE 1

Statistics of the industrial designs

| Design code names | Number of cells (K) | Feature size (nm) |
|---|---|---|
| D1 | 14 | 90 |
| D2 | 91 | 90 |
| D3 | 137 | 90 |
| D4 | 160 | 65 |
| D5 | 168 | 65 |
| D6 | 250 | 90 |
| D7 | 259 | 65 |

The default physical synthesis flow, power-aware placement flow and the automatic sequential cell banking flow are applied on these designs. The default flow is Steps 202, 210k, 212, and 214 of the flow in FIG. 2. The power-aware placement flow performs power-aware placement during timing and congestion driven placement (Step 210 of FIG. 2) in the default flow. All experimental results were measured after detailed routing.

Comparison Between Automatic Sequential Cell Banking and Other Flows

The comparisons of the sequential cell banking flow against the default flow and the power-aware placement flows are summarized in Table 2. In Table 2 the first column enumerates the design quality metrics based on which we compared the three flows. The 2nd and 3rd columns respectively show the average improvement percentages from the sequential cell banking flow over the default and the power-aware placement flows. A negative (positive) percentage indicates an improvement (degradation) from the sequential cell banking flow compared to the other flow. The timing numbers are measured with 10% derating (the delay of each wire or cell can vary ±10%) and CRPR.

TABLE 2

Sequential cell banking vs. default and power-aware placement flows (negative % = improvement)

| | Sequential cell banking vs. default | Sequential cell banking vs. power-aware placement |
|---|---|---|
| Clock power | −19.03% | −14.94% |
| Total Power | −15.26% | −5.20% |
| Clock skew | −2.53% | −0.60% |
| WNS | −1.76% | −1.52% |
| Detailed routing DRC | 5.01% | −30.05% |
| Run time | 1.66X | 1.15X |

The WNS percentage number of a clock is normalized against the clock period. If the design has multiple clocks, the WNS percentage number is the average of all WNS percentage numbers of all of its clocks. The routing DRC (Design Rule Checking) violation number of a flow is the DRC violation number compare to default flow or power-aware placement flow.

Table 2 shows that the sequential cell banking flow reduced on-average clock-tree power by 19.03% and 14.94%, total power by 15.26% and 5.20%, skew under OCV by 2.53% and 0.60%, and WNS (Worst Negative Slack) under OCV by 1.76% and 1.52% compared to the default and power-aware placement flows respectively. From these results it can be concluded that sequential cell banking is effective in saving clock-tree power and improving design timing under the impact of OCV, compared to both the default and the power-aware placement flows.

Routability is measured by the number of routing DRC (Design Rule Checking) violations after detailed route. Note that in today's industrial design flow, routing DRC violations after automatic detailed route are fixed by design engineers using a graphical user interface. Compared to the power-aware placement flow, the sequential cell banking flow reduced the number of routing DRC violations by 30.05%. Compared to the default flow, the sequential cell banking flow increased the total number of routing DRC violations by 5.01%. Power-aware placement and automatic sequential cell banking both impact routability, but the congestion-map based sequential cell bank disassembly method described in Section 2.3 effectively reduced the impact to routability compared to power-aware placement.

Code for automatic sequential cell banking increased the runtime by 1.66× compared to the default flow and 1.15× compared to the power-aware placement flow. Further improvements can be expected to reduce runtime overhead in the future.

Table 3 shows the experimental data from running the three flows on the test cases. The first column shows the code names of the 7 designs. The 2nd column shows the 3 flows, the default, power-aware placement and sequential cell banking flows. The 3rd to the 7th columns show the experimental data in terms of the 5 design quality metrics—clock power, total power, clock skew, WNS and the number of DRC violations after detailed routing.

TABLE 3

Experimental data from default, power-aware placement and sequential cell banking flows

| Flows | Clock pwr mW | Total pwr mW | Clock skew Ns | WNS ns | DRC violations |
|---|---|---|---|---|---|
| D1 def | 3.02 | 11.3 | 0.0519 | −0.11 | 2 |
| pwr-p | 2.97 | 10.9 | 0.0485 | −0.18 | 7 |
| rg. bk | 2.91 | 11 | 0.0539 | 0.02 | 1 |
| D2 def | 10.1 | 39.6 | 0.0898 | −0.24 | 332 |
| pwr-p | 9.04 | 38.1 | 0.0729 | −0.37 | 905 |
| rg. bk | 9.13 | 38 | 0.105 | 0.29 | 283 |
| D3 def | 25.7 | 109 | 0.0873 | 1.19 | 22 |
| pwr-p | 23.9 | 95.1 | 0.113 | 0.53 | 32 |
| rg. bk | 24.2 | 96 | 0.152 | 0.65 | 7 |
| D4 def | 332 | 669 | 293 | −82.7 | 292 |
| pwr-p | 329 | 614 | 201 | −15.8 | 484 |
| rg. bk | 164 | 483 | 128 | 34.4 | 433 |
| D5 def | 70.5 | 80.6 | 4.18 | −0.29 | 170 |
| pwr-p | 66.4 | 74.2 | 3.56 | −0.43 | 169 |
| rg. bk | 63.9 | 73.2 | 2.21 | −0.70 | 307 |
| D6 def | 3.69 | 11.6 | 0.25 | −0.47 | 155 |
| pwr-p | 3.42 | 9.52 | 0.287 | −1.06 | 192 |
| rg. bk | 3.34 | 9.56 | 0.303 | −0.18 | 156 |
| D7 def | 1801 | 1803 | 640 | 435 | 970 |
| pwr-p | 1784 | 1469 | 512 | −129 | 1924 |
| rg. bk | 1172 | 1273 | 449 | −44.6 | 1344 |

Analysis of the Skew and Power Reductions Achieved by Automatic Sequential Cell Banking The following discusses why sequential cell banking reduces skew under OCV. For a tightly-packed sequential cell bank, the detailed router usually generates a fishbone-like net that is good for skew. Furthermore, the fishbone-like nets in the sequential cell banks greatly reduce the net capacitance of the leaf level of the clock tree, which enables the clock tree drive the clock nets using fewer and smaller buffers. As a result, the delays of the clock paths from the clock-tree root to the clock sinks is minimized, which reduces the impact of OCV.

As mentioned above, sequential cell banks enable the clock tree to drive the clock nets using fewer and smaller buffers. As a result, the total buffer area is reduced, which in turn reduces the clock-tree cell leakage and internal (short-circuitry) power. Therefore, automatic sequential cell banking reduces not only net switching power but also clock-tree cell leakage and internal power.

Table 4 supports the above argument. The 3rd to the 6th columns of Table 4 show the experimental data in terms of clock tree buffer area, leakage power, cell internal power and net switching power. The bottom row shows the average reductions in the above metrics achieved by automatic sequential cell banking (negative percentages indicate improvements). Note that the 7.61% average reduction in clock-tree buffer area led to a 7.20% average reduction in clock-tree leakage power and a 7.89% average reduction in clock-tree cell internal power.

TABLE 4

Sequential cell banking reduces clock buffer area, leakage, internal and dynamic power

| Flows | Clock-tree buffer area | Clock-tree leakage power | Clock-tree cell internal power | Clock-tree net switching power |
|---|---|---|---|---|
| D1 def | 2214 | 0.049 | 1.41 | 1.56 |
| rg. bk | 2029 | 0.045 | 1.32 | 1.55 |
| D2 def | 5438 | 0.12 | 3.89 | 6.08 |
| rg. bk | 5227 | 0.108 | 3.47 | 5.46 |
| D3 def | 2114 | 0.24 | 6.55 | 18.9 |
| rg. bk | 2167 | 0.227 | 5.51 | 18.5 |
| D4 def | 2085 | 123 | 135 | 73.6 |
| rg. bk | 1870 | 53.8 | 62.8 | 47.5 |
| D5 def | 18589 | 0.161 | 29.2 | 41.1 |
| rg. bk | 18221 | 0.149 | 24.4 | 39.3 |
| D6 Def | 933 | 0.117 | 1.48 | 2.10 |
| rg. bk | 862 | 0.109 | 1.36 | 1.87 |
| D7 Def | 21829 | 419 | 880 | 502 |
| rg. bk | 20127 | 262 | 528 | 380 |
| Average | −7.61% | −7.20% | −7.89% | −11.10% |

CONCLUSIONS AND FURTHER EMBODIMENTS

Low power and low susceptibility to variation are great challenges that designers face today for designing ICs used in both wireless mobile and wired high-performance systems. Since clock trees are the major culprits for both power consumption and susceptibility to variation, having a clock tree design that is low power and less susceptible to variation is a prerequisite for having an IC design that is low power and robust against variation.

an automatic sequential cell banking technique was presented that enables the synthesis of clock trees that are of lower power and more robust against variation. The sequential cell banking technique as implemented on the top of a commercial physical synthesis tool. Experimental results show that the technique is effective in reducing clock tree power, total power and WNS under on-chip variation.

On 7 industrial 90 nm and 65 nm designs with 14K to 259K cells, after a complete physical synthesis flow, the automatic sequential cell banking technique reduced on-average clock-tree power by 19.0% and 14.9%, total power by 15.3% and 5.2%, and WNS under OCV (±10%) by 1.8% and 1.5% compared to the default and power-aware placement flows respectively.

Other embodiments combine sequential cell banking and power-aware placement to achieve even greater reduction in total power, further reduce the impact of sequential cell banking to routability, and/or reduce the runtime overhead of the automatic sequential cell banking flow compared to the default flow.

Figure 6:
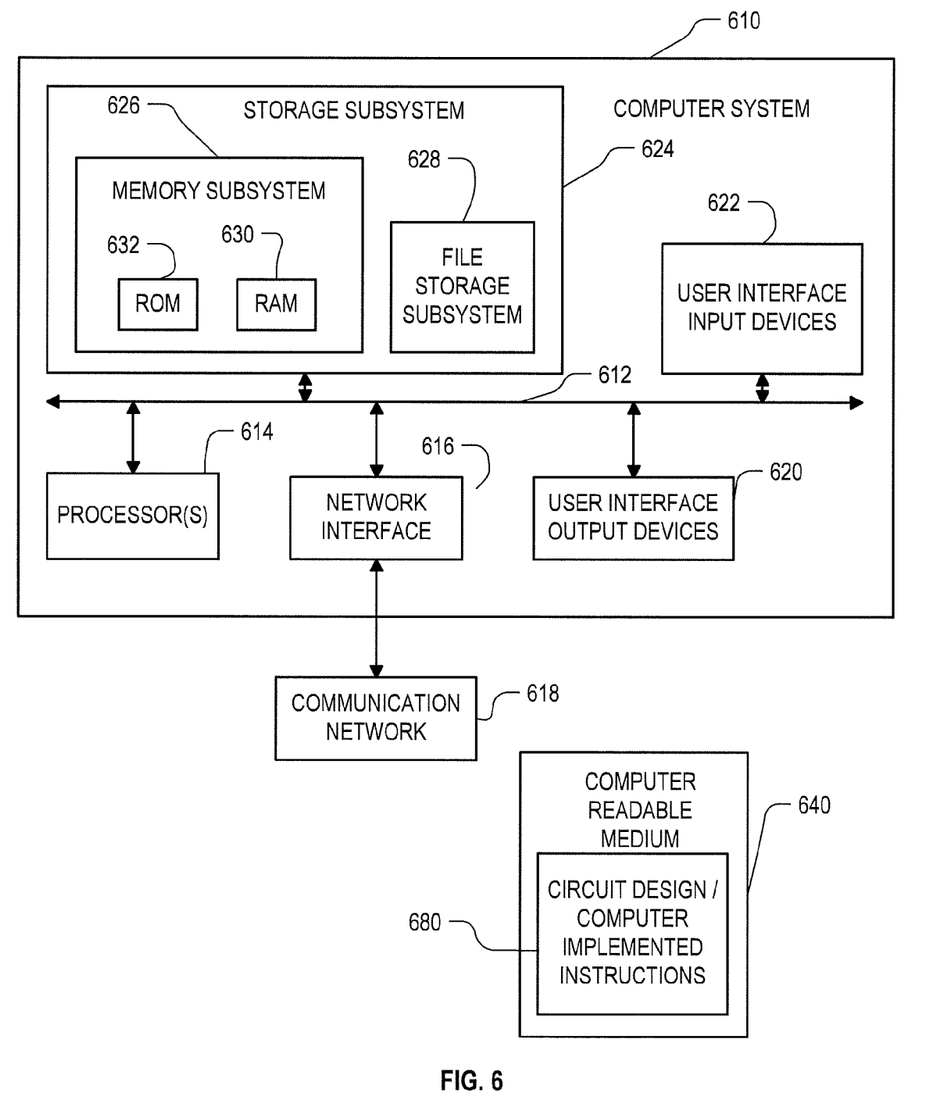
FIG. 6 is a simplified block diagram of a computer system implementing aspects of the present technology.

FIG. 6 is a simplified block diagram of a computer system 610 that can be used to implement software incorporating aspects of the present invention. While the flow charts and other algorithms set forth herein describe series of steps, it will be appreciated that each step of the flow chart or algorithm can be implemented by causing a computer system such as 610 to operate in the specified manner.

Computer system 610 typically includes a processor subsystem 614 which communicates with a number of peripheral devices via bus subsystem 612. Processor subsystem 614 may contain one or a number of processors. The processor subsystem 614 provides a path for the computer system 610 to receive and send information described herein, including within the processor subsystem 614, such as with a multicore, multiprocessor, and/or virtual machine implementation. The peripheral devices may include a storage subsystem 624, comprising a memory subsystem 626 and a file storage subsystem 628, user interface input devices 622, user interface output devices 620, and a network interface subsystem 616. The input and output devices allow user interaction with computer system 610. Network interface subsystem 616 provides an interface to outside networks, including an interface to communication network 618, and is coupled via communication network 618 to corresponding interface devices in other computer systems. Communication network 618 may comprise many interconnected computer systems and communication links. These communication links may be wireline links, optical links, wireless links, or any other mechanisms for communication of information. While in one embodiment, communication network 618 is the Internet, in other embodiments, communication network 618 may be any suitable computer network. The communication network 618 provides a path for the computer system 610 to receive and send information described herein.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 622 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 610 or onto computer network 618.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores the basic programming and data constructs that provide the functionality of certain embodiments of the present invention. For example, the various modules implementing the functionality of certain embodiments of the invention may be stored in storage subsystem 624. These software modules are generally executed by processor subsystem 614.

Memory subsystem 626 typically includes a number of memories including a main random access memory (RAM) 630 for storage of instructions and data during program execution and a read only memory (ROM) 632 in which fixed instructions are stored. File storage subsystem 628 provides persistent storage for program and data files, and may include a hard disk drive, a floppy disk drive along with associated removable media (illustratively shown as computer readable medium 640 storing circuit design 680), a CD ROM drive, an optical drive, or removable media cartridges. The databases and modules implementing the functionality of certain embodiments of the invention may have been provided on a computer readable medium such as one or more CD-ROMs, and may be stored by file storage subsystem 628. The host memory 626 contains, among other things, computer instructions which, when executed by the processor subsystem 614, cause the computer system to operate or perform functions as described herein. As used herein, processes and software that are said to run in or on "the host" or "the computer", execute on the processor subsystem 614 in response to computer instructions and data in the host memory subsystem 626 including any other local or remote storage for such instructions and data.

Bus subsystem 612 provides a mechanism for letting the various components and subsystems of computer system 610 communicate with each other as intended. Although bus subsystem 612 is shown schematically as a single bus, alternative embodiments of the bus subsystem may use multiple busses.

Computer system 610 itself can be of varying types including a personal computer, a portable computer, a workstation, a computer terminal, a network computer, a television, a mainframe, a parallel processing system, a network of more than one computer, or any other data processing system or user device. Due to the ever-changing nature of computers and networks, the description of computer system 610 depicted in FIG. 6 is intended only as a specific example for purposes of illustrating the preferred embodiments of the present invention. Many other configurations of computer system 610 are possible having more or less components than the computer system depicted in FIG. 6.

As used herein, a given activity is "responsive" to a predecessor input if the predecessor input influenced the given activity. If there is an intervening processing element, step or time period, the given activity can still be "responsive" to the predecessor input. If the intervening processing element or step combines more than one input, the activity is considered "responsive" to each of the inputs. "Dependency" of a given activity upon one or more inputs is defined similarly.

The foregoing description of preferred embodiments of the present invention has been provided for the purposes of illustration and description. It is not intended to be exhaustive or to limit the invention to the precise forms disclosed. Many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A method of circuit design of sequential cells including at least one of flip-flops and latches, comprising:
receiving a preliminary placement of the sequential cells of a circuit design netlist into a preliminary arrangement, the preliminary placement based on at least timing and routability of the sequential cells; and
based on the preliminary arrangement, identifying, by a computer, a group of the sequential cells in the preliminary arrangement as being subject to improved power consumption and improved timing variation, upon performing subsequent placement of the group into a proximate arrangement of rows and columns, wherein the proximate arrangement of the sequential cells of the group is different from the preliminary arrangement of the sequential cells of the group.

2. The method of claim 1, further comprising:
performing the subsequent placement of the group into the proximate arrangement of rows and columns.

3. The method of claim 1, further comprising:
performing the subsequent placement of the group into the proximate arrangement of rows and columns; and
responsive to failure to route the proximate arrangement, disbanding the group of the proximate arrangement as being subject to improved routability, upon performing subsequent placement of the disbanded group into a subsequent arrangement of the sequential cells different from the proximate arrangement of rows and columns.

4. The method of claim 1, wherein the group of the sequential cells belongs to a single pipeline stage.

5. The method of claim 1, wherein the group of the sequential cells constitutes a single register transfer language vector.

6. The method of claim 1, wherein the group of the sequential cells constitutes a single register transfer language vector of at least 16 sequential cells.

7. The method of claim 1, wherein the group of the sequential cells is clocked by a common gated clock signal.

8. The method of claim 1, wherein the group of the sequential cells is clocked by a common gated clock signal, and
wherein the group of the sequential cells constitutes a single register transfer language vector of no more than 128 sequential cells.

9. The method of claim 1, wherein a first ratio exceeds a second ratio,
the first ratio being i) a total area of the group of the sequential cells, over ii) an area of a smallest rectangle enclosing the group of the sequential cells, and
the second ratio being i) a total area of all sequential cells of the circuit design netlist, over ii) a total die area of the circuit design netlist minus a total area of hard macros of the circuit design netlist.

10. A computer readable non-transitory medium with computer readable instructions for circuit design of sequential cells including at least one of flip-flops and latches, comprising:
computer instructions receiving a preliminary placement of the sequential cells of a circuit design netlist into a preliminary arrangement, the preliminary placement based on at least timing and routability of the sequential cells; and
computer instructions that, based on the preliminary arrangement, perform identifying a group of the sequential cells in the preliminary arrangement as being subject to improved power consumption and improved timing variation, upon performing subsequent placement of the group into the proximate arrangement of rows and columns, wherein the proximate arrangement of the sequential cells of the group is different from the preliminary arrangement of the sequential cells of the group.

11. A method of circuit design of sequential cells including at least one of flip-flops and latches, comprising:
receiving an identification of a group of the sequential cells of a circuit design netlist, the identification of the group based on a preliminary arrangement from a preliminary placement of the sequential cells, the preliminary placement based on at least timing and routability of the sequential cells; and
performing, by a computer, proximate placement of the group into a proximate arrangement of rows and columns, the group in the proximate arrangement having improved power consumption and improved timing variation, relative to the group in the preliminary arrangement.

12. The method of claim 11, further comprising:
responsive to failure to route the proximate arrangement, disbanding the group of the proximate arrangement as being subject to improved routability, upon performing subsequent placement of the disbanded group into a subsequent arrangement of the sequential cells different from a proximate arrangement of rows and columns.

13. The method of claim 11, wherein said performing proximate placement includes:
determining numbers of the rows and columns of the proximate arrangement, such that a first height-over-width ratio of the proximate arrangement approximates a second height-over-width ratio of a smallest rectangle enclosing the group of the sequential cells in the preliminary placement.

14. The method of claim 11, wherein said performing proximate placement includes:
determining relative locations in the proximate arrangement of sequential cells in the group, based on relative locations in the preliminary arrangement of sequential cells in the group.

15. The method of claim 11, wherein said performing proximate placement includes:
determining relative horizontal coordinate locations in the proximate arrangement of sequential cells in the group, based on relative horizontal coordinate locations in the preliminary arrangement of sequential cells in the group.

16. The method of claim 11, wherein said performing proximate placement includes:
determining relative vertical coordinate locations in the proximate arrangement of sequential cells in the group, based on relative vertical coordinate locations in the preliminary arrangement of sequential cells in the group.

17. The method of claim 11, wherein said performing proximate placement includes:
placing integrated clock gating cells at an intermediate location of the proximate arrangement.

18. A computer readable non-transitory medium with computer readable instructions for circuit design of sequential cells including at least one of flip-flops and latches, comprising:
computer instructions receiving an identification of a group of the sequential cells of a circuit design netlist, the identification of the group based on a preliminary arrangement from a preliminary placement of the sequential cells, the preliminary placement based on at least timing and routability of the sequential cells; and computer instructions performing proximate placement of the group into a proximate arrangement of rows and columns, the group in the proximate arrangement having improved power consumption and improved timing variation, relative to the group in the preliminary arrangement.

19. A method of circuit design of sequential cells including at least one of flip-flops and latches, comprising:

receiving a proximate arrangement of rows and columns of a group of the sequential cells of a circuit design netlist;

responsive to failure to route the proximate arrangement, disbanding, by a computer, the group of the proximate arrangement as being subject to improved routability, upon performing subsequent placement of the disbanded group into a subsequent arrangement of the sequential cells different from the proximate arrangement of rows and columns.

20. The method of claim 19, further comprising:

performing the subsequent placement of the sequential cells of the disbanded group.

21. The method of claim 19, wherein said responsive to failure to route the proximate arrangement, comprises:

determining that a number of nets of the proximate arrangement exceeds a routing capacity.

22. A computer readable non-transitory medium with computer readable instructions for circuit design of sequential cells including at least one of flip-flops and latches, comprising:

computer instructions receiving a proximate arrangement of rows and columns of a group of the sequential cells of a circuit design netlist;

computer instructions responsive to failure to route the proximate arrangement, disbanding the group of the proximate arrangement as being subject to improved routability, upon performing subsequent placement of the disbanded group into a subsequent arrangement of the sequential cells different from the proximate arrangement of rows and columns.

* * * * *